(12) United States Patent
Wada et al.

(10) Patent No.: US 9,077,195 B2
(45) Date of Patent: Jul. 7, 2015

(54) INPUT-OUTPUT CIRCUIT

(75) Inventors: Atsushi Wada, Ogaki (JP); Hajime Mizukami, Gifu (JP); Mitsuaki Hatakeyama, Gifu-ken (JP); Shigeto Kobayashi, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 660 days.

(21) Appl. No.: 13/430,237

(22) Filed: Mar. 26, 2012

(65) Prior Publication Data

US 2012/0256596 A1 Oct. 11, 2012

(30) Foreign Application Priority Data

Mar. 24, 2011 (JP) ................................ 2011-066491

(51) Int. Cl.
*H02J 7/00* (2006.01)
*H03D 1/00* (2006.01)

(52) U.S. Cl.
CPC ....... *H02J 7/0055* (2013.01); *H02J 2007/0001* (2013.01)

(58) Field of Classification Search
None
See application file for complete search history.

(56) References Cited

U.S. PATENT DOCUMENTS

| | | | |
|---|---|---|---|
| 8,242,742 B2 * | 8/2012 | Kao et al. | 320/114 |
| 8,541,984 B2 | 9/2013 | Hsu et al. | |
| 2004/0169489 A1 | 9/2004 | Hobbs | |
| 2005/0174094 A1 * | 8/2005 | Purdy et al. | 320/134 |
| 2009/0121684 A1 * | 5/2009 | Hussain et al. | 320/139 |
| 2009/0189569 A1 * | 7/2009 | Hsu et al. | 320/160 |
| 2010/0201308 A1 | 8/2010 | Lindholm | |
| 2011/0095722 A1 | 4/2011 | Chang | |

FOREIGN PATENT DOCUMENTS

JP 2010-205437 9/2010

* cited by examiner

*Primary Examiner* — Drew A Dunn
*Assistant Examiner* — Steve T Chung
(74) *Attorney, Agent, or Firm* — Rennie William Dover (57) ABSTRACT

A power supply detection circuit detects power feeding to a VBUS terminal from the outside. A charger detection circuit specifies the kind of charger by detecting the voltages of a DP terminal and a DM terminal. The charger detection circuit detects open, pull-up, pull-down of at least one of the DP terminal and the DM terminal or formation of a short circuit between both the terminals.

16 Claims, 10 Drawing Sheets

|     | Step1 | | Step2 | | MODE |
| --- | --- | --- | --- | --- | --- |
|     | DP | DM | DP | DM |     |
| (1) | H | H | H |   | MAKER A |
| (2) | H | H | L |   | DM"H" |
| (3) | H | M |   |   | MAKER B |
| (4) | H | L |   |   | open |
| (5) | L | L | H |   | DP−DMshort |
| (6) | L | L | L |   | USB COMMUNICATION |

INPUT-OUTPUT CIRCUIT

This application is based upon and claims the benefit of priority from the prior Japanese Patent Application No. 2011-066491, filed on Mar. 24, 2011, the entire content is incorporated herein by reference.

BACKGROUND OF THE INVENTION

1. Field of the Invention

The present invention relates to an input-output circuit that is disposed between a connector including a power feeding terminal and a data communication terminal and an internal circuit.

2. Description of the Related Art

Recently, smartphones have been rapidly come into wide use. In many smartphones, in order to improve the designability or decrease the circuit scale, a connector is attempted to be used in common. For example, models only having a micro-USB connector are also available in the market. In such models, in addition to power feeding and data communication, transmission/reception of an audio signal is performed through one micro-USB connector. Such commonization of a connector has been attempted also in other mobile devices such as a cellular phone, a small-sized PC, a digital camera, a portable music player, an IC recorder, and a game machine.

While there is such a trend of the communization of a connector, the number of kinds of devices, chargers, and accessories connected to each mobile device has been increased every year, and it becomes difficult for the mobile device side to determine a member that is connected thereto.

When a mobile device is charged, there are many cases where it is charged by using a charger that is not dedicated thereto. In the market, a variety of chargers other than dedicated chargers are available. Since charging currents of the chargers are not uniformized, it is necessary to allow a charging circuit that is disposed inside the mobile device to recognize the kind of charger.

SUMMARY OF THE INVENTION

According to an aspect of the present invention, an input-output circuit that connects a connector including: at least a power supply terminal; and a first data terminal and a second data terminal, which are data terminals of a differential pair, and an internal circuit to each other, and the input-output circuit includes: a power supply detection circuit that detects power feeding to the power supply terminal from the outside; and a charger detection circuit that specifies the kind of charger by detecting voltages of the first data terminal and the second data terminal, wherein the charger detection circuit detects open, pull-up, pull-down of at least one of the first data terminal and the second data terminal, or formation of a short circuit between both the terminals.

DETAILED DESCRIPTION OF THE INVENTION

The invention will now be described by reference to the preferred embodiments. This does not intend to limit the scope of the present invention, but to exemplify the invention.

Figure 1:
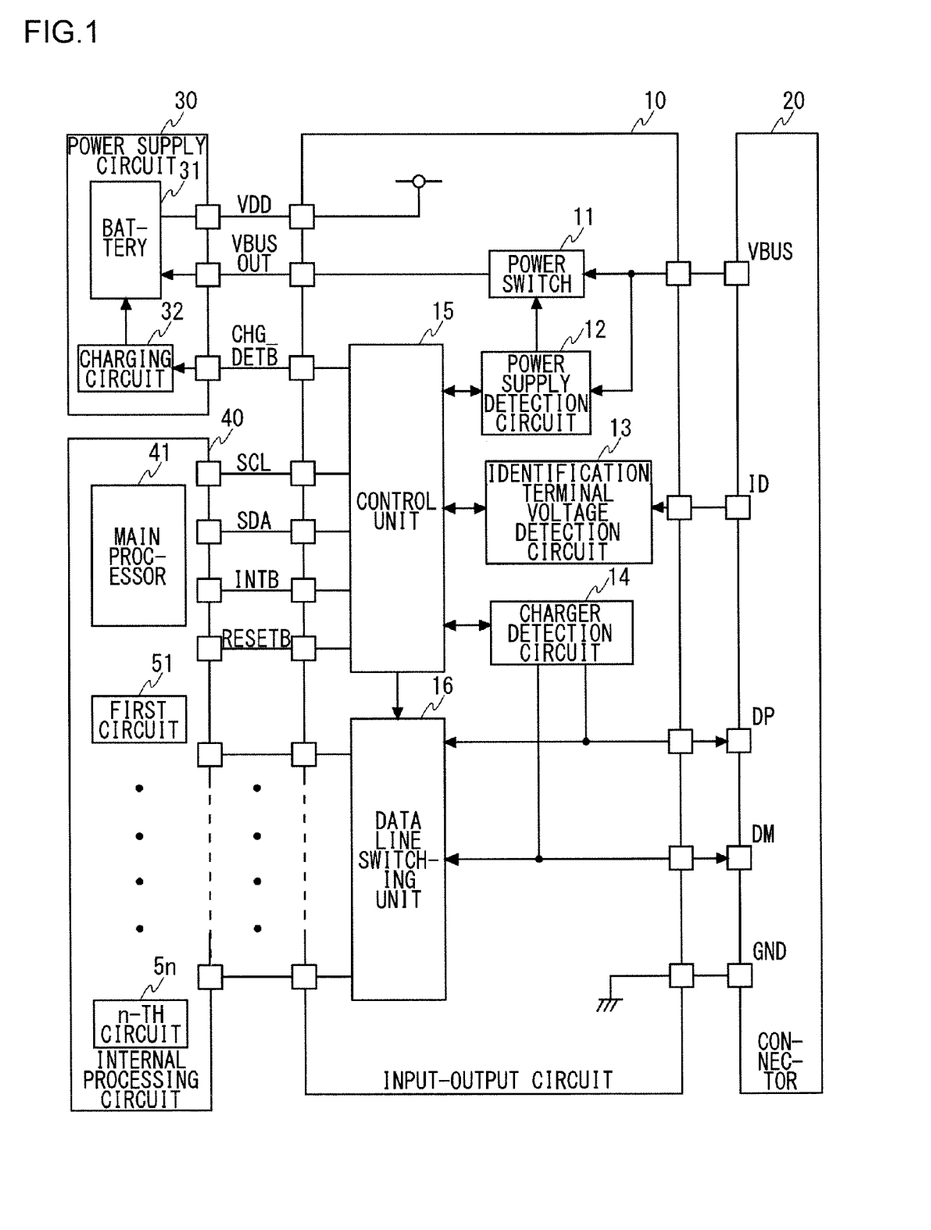
FIG. 1 is a diagram illustrating the configuration of an input-output circuit according to an embodiment of the present invention.

FIG. 1 is a diagram illustrating the configuration of an input-output circuit 10 according to an embodiment of the present invention. The input-output circuit 10 connects a connector 20 and a power supply circuit 30 and an internal processing circuit 40 which are internal circuits. Hereinafter, in the present specification, an example will be illustrated in which the input-output circuit 10, the connector 20, the power supply circuit 30, and the internal processing circuit 40 are mounted in a smartphone. In addition, an example will be described in which a micro-USB connector is used as the connector 20. The micro-USB connector has five terminals (pins) including a power supply terminal (VBUS), a ground terminal (GND), differential pair terminals (D+ and D−), and an identification line terminal (ID).

The power supply circuit 30 includes a battery 31 and a charging circuit 32. As the battery 31, a lithium ion battery or a nickel hydrogen battery is used. When a charger is connected to the connector 20, under the control of the charging circuit 32, power is charged in the battery 31 from the charger through a power supply path arranged inside the input-output circuit 10.

The internal processing circuit 40 includes a main processor 41, a first circuit 51, . . . , an n-th circuit 5n. The main processor 41 controls the overall operation of a terminal device (a smartphone in this embodiment) in which the main processor is mounted. The first circuit 51, . . . , and the n-th circuit 5n are circuits that perform dedicated processes. For example, an image processing circuit, an audio processing circuit, a physical layer chip (PHY) circuit, a universal asynchronous receiver transmitter (UART) circuit, and the like correspond thereto. The main processor 41 and the first circuit 51, . . . , the n-th circuit 5n transmit and receive signals to and from a device (for example, a PC) or an accessory device (for example, an earphone, a headphone, or a microphone) that is connected to the connector 20 through the input-output circuit 10.

The input-output circuit 10 includes a power switch 11, a power supply detection circuit 12, an identification terminal voltage detection circuit 13, a charger detection circuit 14, a control unit 15, and a data line switching unit 16. The power of the input-output circuit 10 is basically supplied from the battery 31 through a VDD terminal. In addition, the power of the power supply detection circuit 12 is supplied from the charger connected to the connector 20 through a VBUS terminal.

The power switch 11 is a switch that switches between conduction of power, which is supplied from the charger connected to the connector 20 through the VBUS terminal, to the battery 31 through a VBUSOUT terminal and blocking of the power. As the power switch 11, a power MOSFET or the like may be used. The switching of the power switch 11 is controlled by the power supply detection circuit 12.

The power supply detection circuit 12 detects the power feeding to the VBUS terminal from the outside. In other words, the power supply detection circuit 12 detects that a charger is connected to the connector 20. When the power feeding to the VBUS terminal from the outside is detected, the power supply detection circuit 12 turns on the power switch 11 and notifies the control unit 15 of the detection of power. Alternatively, the power supply detection circuit 12 may be designed so as to turn on the power switch 11 after a permission signal for turning on the power switch 11 is received from the control unit 15.

The identification terminal voltage detection circuit 13 detects a voltage of an ID terminal and notifies the control unit 15 of the detected voltage. For example, the identification terminal voltage detection circuit 13 may be configured by an analog-to-digital converter. Many of the accessory devices use the value of resistance between the ID terminal and the GND terminal as its identification information. Accordingly, by detecting the voltage of the ID terminal of the connector 20, the kind of the accessory device connected to the connector 20 can be almost specified.

The charger detection circuit 14 specifies the kind of a charger by monitoring and detecting the voltages of the DP terminal and the DM terminal. More specifically, the charger detection circuit 14 detects the open, the pull-up, and the pull-down of at least one of the DP terminal and the DM terminal or formation of a short circuit between both terminals. In addition, the charger detection circuit 14 can also detect the kind (a difference in the pull-up/pull-down resistance) of the pull-up/pull-down. The charger detection circuit 14 notifies the control unit 15 of the detection result.

The control unit 15 controls the overall operation of the input-output circuit 10. In this embodiment, an example will be described in which an I²C serial controller is used in the control unit 15. In such a case, the control unit 15 receives a clock signal from the internal processing circuit 40 through an I²C_SCL terminal. In addition, a data signal is transmitted and received between the control unit 15 and the internal processing circuit 40 through an I²C_SDA terminal. Furthermore, the control unit 15 supplies an interrupt signal to the internal processing circuit 40 through an INTB terminal. In addition, the control unit 15 receives a hardware reset signal from the internal processing circuit 40 through a RESETB terminal.

The control unit 15 supplies a charger detection signal to the charging circuit 32 through a CHG_DETB terminal. In addition, the control unit 15 can supply control signals to the power supply detection circuit 12, the identification terminal voltage detection circuit 13 and the charger detection circuit 14.

The data line switching unit 16 includes a plurality of switches and performs a switching control of various signals that are transmitted and received between the internal processing circuit 40 and an external device through the DP terminal and the DM terminal. In the description presented here, since switching performed by the data line switching unit 16 is not focused on, the description of a detailed internal configuration thereof will not be presented.

Figure 2:
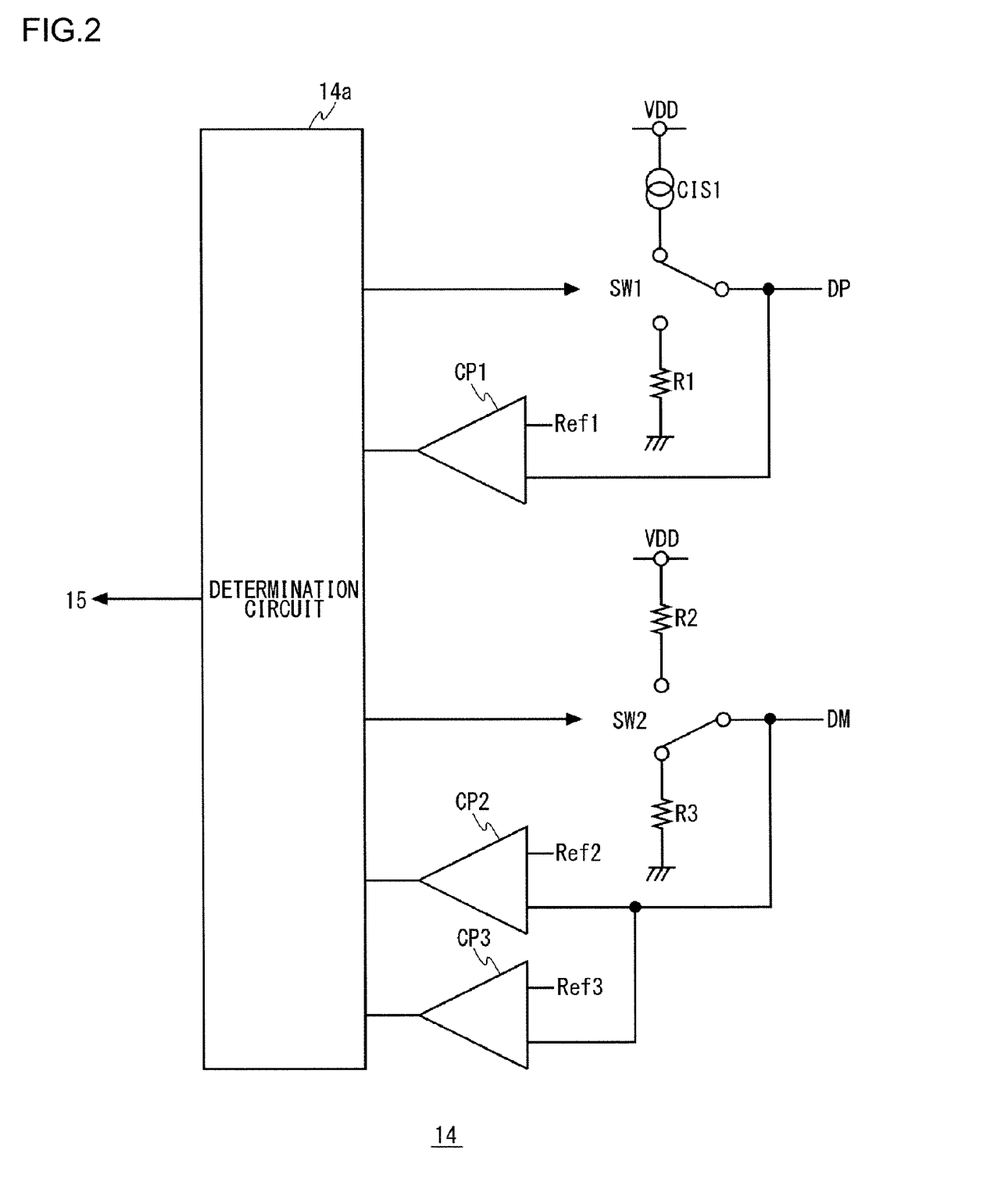
FIG. 2 is a diagram illustrating a configuration example of a charger detection circuit according to an embodiment of the present invention.

FIG. 2 is a diagram illustrating a configuration example of the charger detection circuit 14 according to an embodiment of the present invention. The charger detection circuit 14 includes a first comparator CP1, a second comparator CP2, a third comparator CP3, and a determination circuit 14a. The first comparator CP1 compares the voltage of the DP terminal and a first reference voltage Ref1 and outputs the determination result to the determination circuit 14a. More particularly, when the voltage of the DP terminal is higher than the first reference voltage Ref, the first comparator CP1 outputs a high level, and, when the voltage of the DP terminal is lower than the first reference voltage Ref, the first comparator CP1 outputs a low level.

The second comparator CP2 compares the voltage of the DM terminal and a second reference voltage Ref2 and outputs the determination result to the determination circuit 14a. More particularly, when the voltage of the DM terminal is higher than the second reference voltage Ref2, the second comparator CP2 outputs the high level, and, when the voltage of the DM terminal is lower than the second reference voltage Ref2, the second comparator CP2 outputs the low level. The third comparator CP3 compares the voltage of the DM terminal and a third reference voltage Ref3 and outputs the determination result to the determination circuit 14a. More particularly, when the voltage of the DM terminal is higher than the third reference voltage Ref3, the third comparator CP3 outputs the high level, and, when the voltage of the DM terminal is lower than the third reference voltage Ref3, the third comparator CP3 outputs the low level.

The determination circuit 14a determines the kind of charger connected to the connector 20 in accordance with the output results of the first comparator CP1, the second comparator CP2, and the third comparator CP3. In addition, when the output of the second comparator CP2 is at the low level, and the output of the third comparator CP3 is at the high level, the determination circuit 14a determines that the determination result of the DM terminal to be a middle level.

The charger detection circuit 14 further includes a first pull-up circuit, a first pull-down circuit, a second pull-up circuit, a second pull-down circuit, a first switch SW1 and a second switch SW2. The first pull-up circuit includes a first constant current supply CIS1 that is connected to a power supply VDD, and the constant current supply CIS1 is connected to the DP terminal through the first switch SW1, whereby a configuration is formed in which the DP terminal can be pulled up. The first pull-down circuit includes a first resistor R1 that is connected to the ground, and the first resistor R1 is connected to the DP terminal through the first switch SW1, whereby a configuration is formed in which the DP terminal can be pulled down. The second pull-up circuit includes a second resistor R2 that is connected to the power supply VDD, and the second resistor R2 is connected to the DM terminal through the second switch SW2, whereby a configuration is formed in which the DM terminal can be pulled up. The second pull-down circuit includes a third resistor R3 that is connected to the ground, and the third resistor R3 is connected to the DM terminal through the second switch SW2, whereby a configuration is formed in which the DM terminal can be pulled down.

In FIG. 2, the resistance value of the first resistor R1 is set to a value higher than the resistance value of the third resistor R3. For example, the resistance value of the first resistor R1 is set to a value that is twice the resistance value of the third resistor R3. The resistance value of the second resistor R2 is set to be extremely low. The current value of a current that is allowed to flow by the constant current supply CIS1 is set to be extremely low as well. In addition, the relation among the first reference voltage Ref1, the second reference voltage Ref2, and the third reference voltage Ref3 is set such that the third reference voltage Ref3<the first reference voltage Ref1<the second reference voltage Ref2. This circuit configuration is merely an example, and the full-down resistance may be a pull-down current, and the pull-up resistance may be a constant voltage.

In this embodiment, the determination circuit 14a determines the kind of charger that is connected to the connector 20 in two steps. In a first step, the DP terminal is connected to the first pull-up circuit, and the DM terminal is connected to the second pull-down circuit. In a second step, the DP terminal is connected to the first pull-down circuit, and the DM terminal is connected to the second pull-up circuit.

Figure 3:
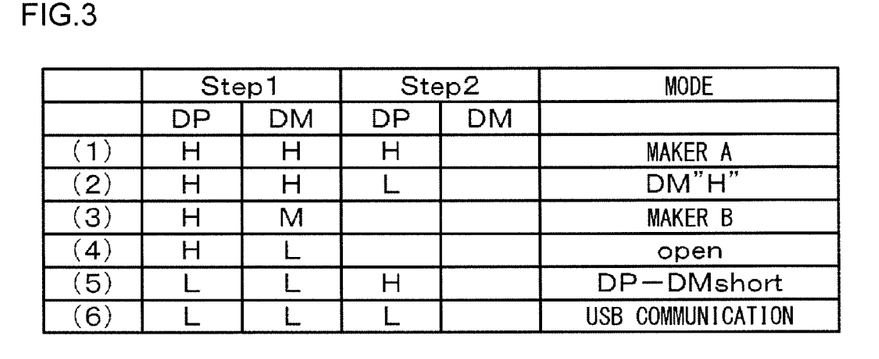
FIG. 3 is a diagram illustrating a table that illustrates a mode determination process performed by a determination circuit according to an embodiment of the present invention.

FIG. 3 is a diagram illustrating a table that illustrates a mode determination process performed by a determination circuit 14a according to an embodiment of the present invention. In FIG. 3, modes of six types are defined, and, among them, modes of four types are modes in which charging is performed. In standards such as the USB-IF (BCS), a method of determining a USB-dedicated charger is defined. In particular, formation of a short circuit between the DP terminal and the DM terminal is defined to represent a dedicated charger. In addition, generally, in data communications through an USB, the DP terminal and the DM terminal are configured to be terminated. In the example, illustrated in FIG. 3, it is assumed that each of maker A and maker B manufactures and sells a charger having proprietary specifications.

In FIG. 3, a first mode represents a mode in which a charger manufactured by maker A is connected. In addition, a second mode represents a mode in which a charger employing a high level of the DM terminal that is defined in standards such as the USB-IF (BCS) is connected. A third mode represents a mode in which a charger manufactured by maker B is connected. In addition, a fourth mode represents an open mode in which nothing is connected to the DP terminal and the DM terminal from the outside. A fifth mode represents a mode in which a charger employing the formation of a short circuit between the DP terminal and the DM terminal, which is defined in standards such as the USB-IF (BCS) is connected. In addition, a sixth mode represents a mode in which the DP terminal and the DM terminal are configured to be terminated and are not fed with power.

Among these modes, the first mode, the second mode, the third mode, and the fifth mode are modes in which power is fed, and the determination circuit 14a determines a mode based on the output results of the first comparator CP1, the second comparator CP2, and the third comparator CP3. In other words, the determination circuit 14a determines which charger out of chargers of the four kinds is connected.

In the case of the fourth mode, since nothing is connected to the DP terminal and the DM terminal from the outside, the DP terminal is pulled up by the first pull-up circuit, and the first comparator CP1 outputs the high level. On the other hand, the DM terminal is pulled down by the second pull-down circuit, and the second comparator CP2 and the third comparator CP3 output the low level. When the DP terminal is at the high level, and the DM terminal is at the low level, the determination circuit 14a determines the fourth mode. Since the fourth mode is uniquely specified in the first step, it is not necessary to proceed to the second step.

In the case of the fifth mode, since the DP terminal and the DM terminal form a short circuit therebetween, a current flows from the power supply of the first pull-up circuit to the ground of the second pull-down circuit. In addition, since the resistance value of the third resistor R3 is set to be low, the voltages of the DP terminal and the DM terminal are low, and the first comparator CP1, the second comparator CP2, and the third comparator CP3 each output the low level. In the case of the sixth mode, since the DP terminal and the DM terminal are configured to be terminated, the voltages of the DP terminal and the DM terminal are low, and the first comparator CP1, the second comparator CP2, and the third comparator CP3 each output the low level.

As described above, in a case where both the DP terminal and the DM terminal are at the low level as the determination result of the first step, the determination circuit 14a may not determine whether it is in the fifth mode or the sixth mode. In such a case, in order to proceed to the second step, the determination circuit 14a transmits a switching signal to the first switch SW1, separates the first pull-up circuit from the DP terminal, and connects the first pull-down circuit to the DP terminal. Similarly, the determination circuit 14a transmits a switching signal to the second switch SW2, separates the second pull-down circuit from the DM terminal, and connects the second pull-up circuit to the DM terminal.

In the case of the fifth mode, since the DP terminal and the DM terminal form a short circuit therebetween, a current flows from the power supply of the second pull-up circuit to the ground of the first pull-down circuit. At this time, since the resistance value of the first resistor R1 is set to be high, and the value of the first reference voltage Ref1 is set to be low, the output of the first comparator CP1 changes from the low level to the high level. On the other hand, in the case of the sixth mode, since the DP terminal is configured to be terminated, the output of the first comparator CP1 maintains the low level. Accordingly, the determination circuit 14a can determine the fifth mode in a case where the output of the first comparator CP1 is inverted, and the determination circuit 14a can determine the sixth mode in a case where the output is not inverted.

Figure 4:
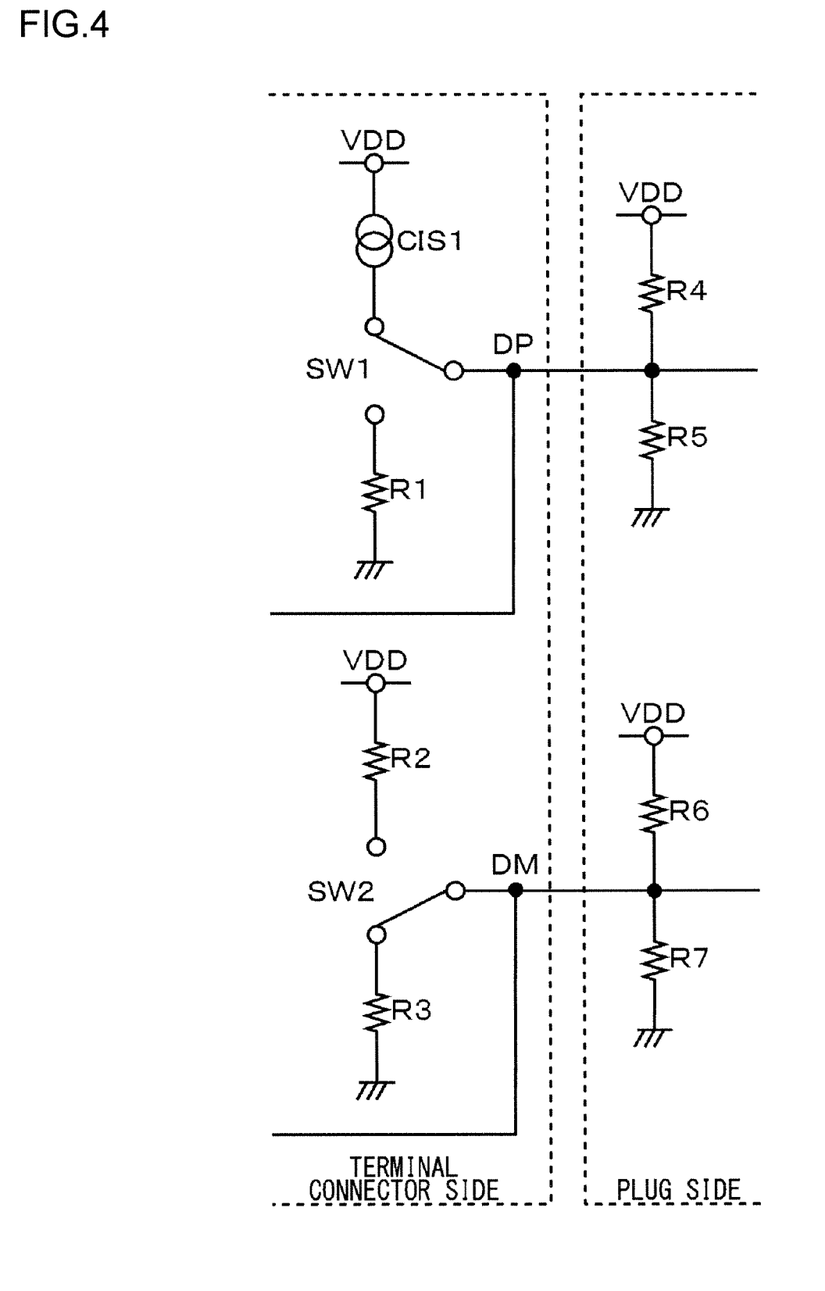
FIG. 4 is a diagram illustrating the configuration of a DP terminal and a DM terminal of a charger manufactured by maker B.

FIG. 4 is a diagram illustrating the configuration of a DP terminal and a DM terminal of a charger manufactured by maker B. The DP terminal located inside the plug of the charger is connected to a power supply VDD through a fourth resistor R4 and is connected to the ground through a fifth resistor R5. The DM terminal is connected to the power supply VDD through a sixth resistor R6 and is connected to the ground through a seventh resistor R7. Here, it is assumed that the power supply voltage VDD supplied to the terminal connector side is designed to be lower than the power supply voltage VDD supplied to the plug side. The resistance value of the fourth resistor R4 is set to be higher than that of the fifth resistor R5, and the divided voltage is set to be high. The resistance value of the sixth resistor R6 is set to be approximately the same as that of the seventh resistor R7, and the divided voltage is set to an approximately midpoint potential.

As illustrated in FIG. 4, in the fourth mode, the DP terminal is pulled up by the first pull-up circuit, and the first comparator CP1 outputs the high level. On the other hand, since the resistance value of the third resistor R3 is low, a midpoint potential is maintained at the DM terminal, the second comparator CP2 outputs the low level, and the third comparator CP3 outputs the high level. When the DP terminal is at the high level, and the DM terminal is at the middle level, the determination circuit 14a determines the third mode. Since the third mode is uniquely specified in the first step, it is not necessary to proceed to the second step.

In addition, in a case where the charger manufactured by maker B is not supported, it is not necessary to arrange the third comparator CP3. Furthermore, it is necessary to set the resistance value of the second resistor R2, the resistance value of the third resistor R3, the value of the second reference voltage Ref2, and the value of the third reference voltage Ref3 to values for which the DM terminal of the charger manufactured by maker B can be determined to be at a middle level.

Figures 5A, 5B:
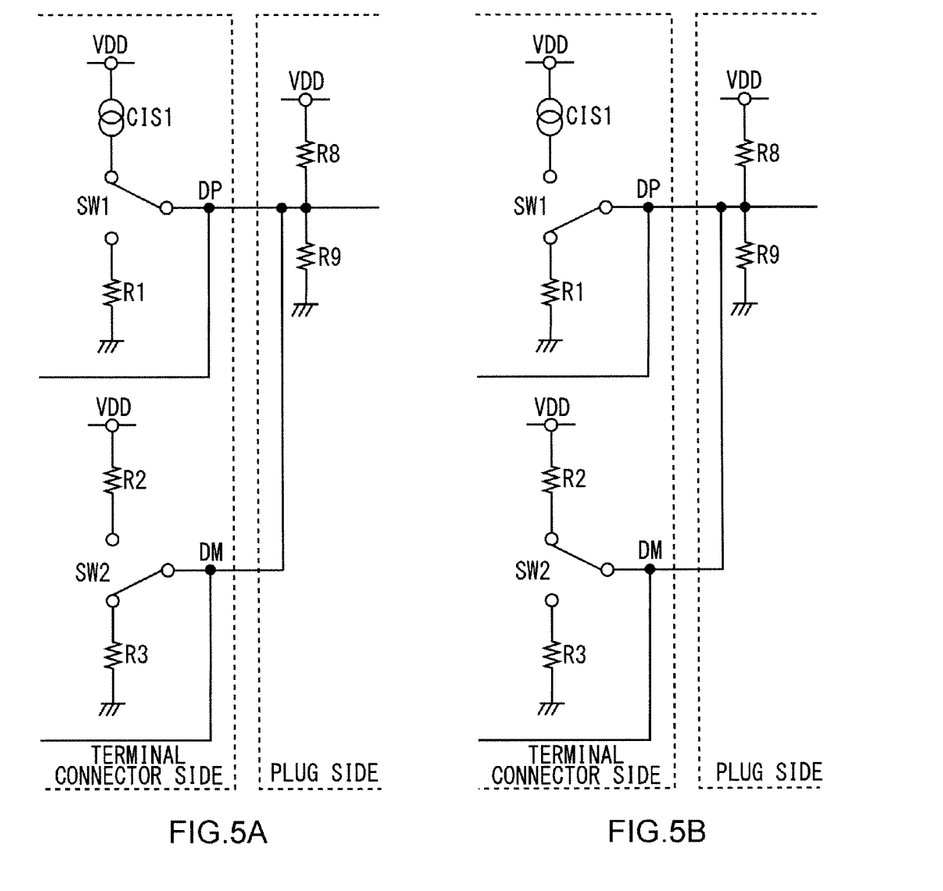
FIGS. 5A and 5B are diagrams illustrating the configuration of a DP terminal and a DM terminal of a charger manufactured by maker A.

FIGS. 5A and 5B are diagrams illustrating the configuration of a DP terminal and a DM terminal of a charger manufactured by maker A. FIG. 5A illustrates a first step state, and FIG. 5B illustrates a second step state. The DP terminal and the DM terminal, which are located inside the plug of the charger, are connected to the power supply VDD through an eighth resistor R8 and are connected to the ground through a ninth resistor R9. Here, it is assumed that the power supply voltage VDD supplied to the terminal connector side is designed to be lower than the power supply voltage VDD supplied to the plug side. The resistance value of the eighth resistor R8 is set to be lower than that of the ninth resistor R9, and the resistance values of the eighth resistor R8 and the ninth resistor R9 are relatively set to be extremely low, compared to the resistance value of the third resistor R3.

As illustrated in FIG. 5A, in the case of the first mode, the DP terminal and the DM terminal are pulled up by the first pull-up circuit, the first comparator CP1, the second comparator CP2, and the third comparator CP3 each output the high level. In addition, in the case of the second mode, it is standardized that the DP terminal is pulled up by the first pull-up circuit, and the DM terminal is set to the high level, and accordingly the first comparator CP1, the second comparator CP2, and the third comparator CP3 each output the high level.

As described above, in a case where both the DP terminal and the DM terminal are determined to be at the high level as the determination result of the first step, the determination circuit 14a may not determine whether it is in the first mode or the second mode. In such a case, in order to proceed to the second step, the determination circuit 14a transmits a switching signal to the first switch SW1, separates the first pull-up circuit from the DP terminal, and connects the first pull-down circuit to the DP terminal. Similarly, the determination circuit 14a transmits a switching signal to the second switch SW2, separates the second pull-down circuit from the DM terminal, and connects the second pull-up circuit to the DM terminal.

In the case of the second mode, nothing is connected to the DP terminal from the outside, and thus, when the first pull-down circuit is connected to the DP terminal, the voltage of the DP terminal is lowered, and the output of the first comparator CP1 changes from the high level to the low level. On the other hand, in the case of the first mode, since a divided voltage according to the eighth resistor R8 and the ninth resistor R9 hardly decreases before and after the switching from the first pull-up circuit to the first pull-down circuit, the output of the first comparator CP1 is maintained at the high level. Accordingly, in a case where the output of the first comparator CP1 is inverted, the determination circuit 14a can determine the first mode, and, in a case where the output is not inverted, the determination circuit 14a can determine the second mode.

In addition, the determination circuit 14a may stop the operations of the first comparator CP1, the second comparator CP2, and the third comparator CP3 after the end of the detection process according to the second step. For example, the determination circuit 14a proceeds to a power blocking state or a power saving state. In such a case, when power feeding from the outside is detected by the power supply detection circuit 12, the determination circuit 14a receives a start-up signal through the control unit 15 or directly from the power supply detection circuit 12 and returns the first comparator CP1, the second comparator CP2, and the third comparator CP3 to a state in which a normal operation can be performed. Accordingly, power consumption of the charger detection circuit 14 can be reduced.

When the mode detection process is completed, the charger detection circuit 14 outputs the detection result to the control unit 15. When the detection result is received from the charger detection circuit 14, in a case where an effective charger is connected to the connector 20, the control unit 15 notifies the charging circuit 32 of the connection of the effective charger. Accordingly, even in a case where the internal processing circuit 40 may not be started up due to running-out of the battery or the like, the power supply circuit 30 can be directly notified of the detection of a connection of a charger from the input-output circuit 10. In the circuit configuration illustrated in FIG. 1, the charging circuit 32 may not be directly notified of the kind of charger from the control unit 15.

When the detection result is received from the charger detection circuit 14, the control unit 15 stores the kind in an internal register. The control unit 15 notifies the main processor 41 of the kind of charger connected to the connector 20 as is necessary. For example, in a case where a request for acquiring the kind of charger is output from the main processor 41, the control unit 15 notifies the main processor 41 of the kind of the charger through the I²C_SDA terminal. The I²C_SDA terminal is not a terminal that is newly installed for a notification of the kind of charger but a terminal that is originally required for a notification of a detection result acquired through the ID terminal or the like.

The main processor 41 instructs the charging circuit 32 to perform a charging control corresponding to the kind of charger. For example, in a case where the specification of the charger is low, the main processor 41 instructs the charging circuit 32 to limit the amount of power drawn in the battery 31. In such a case, the charger is protected, and a steep voltage drop in the power supply line can be suppressed.

As described above, according to this embodiment, by arranging the charger detection circuit 14 that can detect the open, the pull-up, and the pull-down of at least one of the DP terminal and the DM terminal or formation of a short circuit between both the terminals within the input-output circuit 10, the kind of charger connected to the connector 20 can be precisely recognized with low power consumption while suppressing an increase in the circuit scale. In addition, by using a determination method performed in two steps, an increase in the number of comparators can be suppressed, and an increase in the circuit area is suppressed, which leads to low power consumption as well.

Next, a structure will be described which is used for correctly performing the above-described charger detection process. In order to correctly perform the charger detection process, after the notification of the detection of power feeding is received from the power supply detection circuit 12, the control unit 15 adjusts the timing and instructs the charger detection circuit 14 to start a charger kind detection process. Hereinafter, detailed description will be followed.

Figure 6:
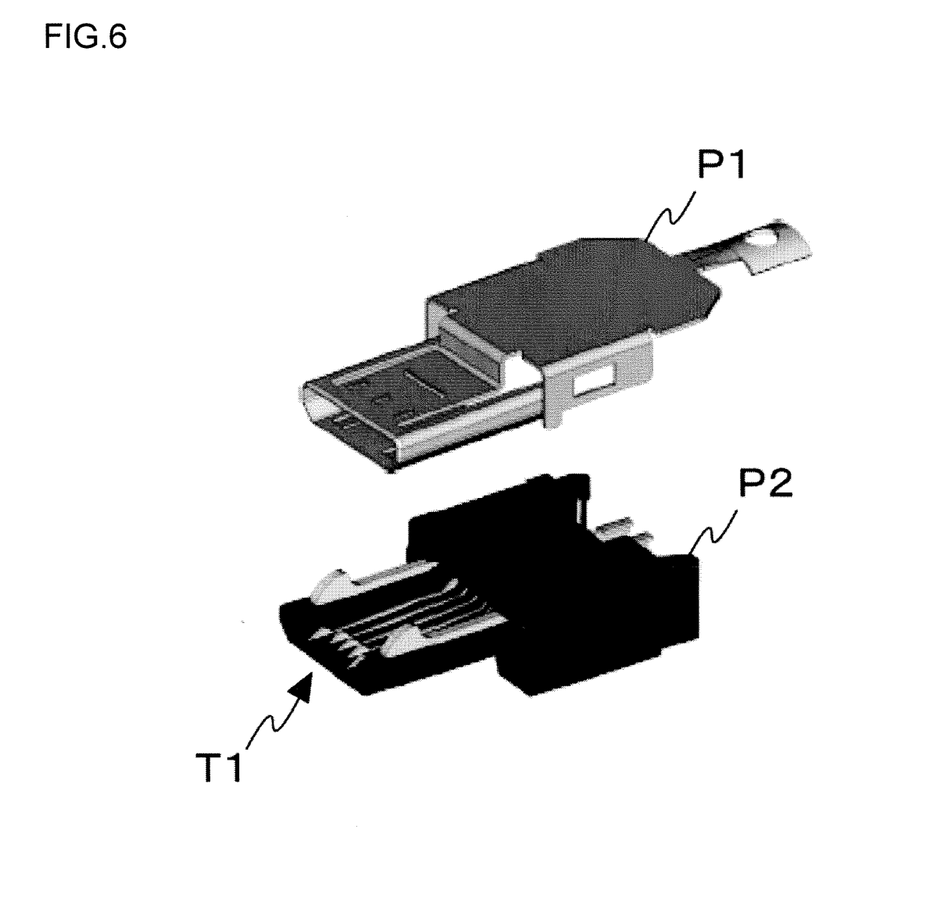
FIG. 6 is a diagram illustrating the structure of a micro-USB plug socket.
Figure 7:
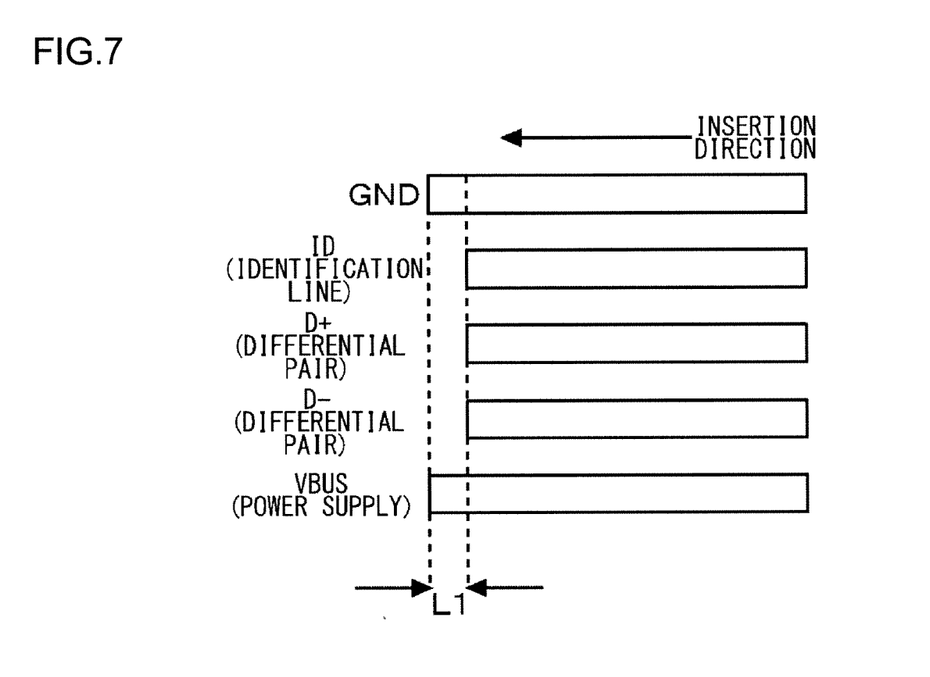
FIG. 7 is a diagram illustrating a terminal area viewed from the upper side.

FIG. 6 is a diagram illustrating the structure of a micro-USB plug socket. FIG. 6 is a diagram in which a terminal area T1 is exposed by excluding an upper lid P1 of the plug socket from a main body P2. FIG. 7 is a diagram illustrating the terminal area T1 viewed from the upper side. As described above, the terminal area T1 of the micro-USB is configured by five terminals (pins) including the power supply terminal (VBUS), the ground terminal (GND), the differential pair terminals (D+ and D−), and the identification line terminal (ID).

Among these, the power supply terminal (VBUS) and the ground terminal (GND) further extend in the insertion direction than the differential pair terminals (D+ and D−) and the identification line terminal (ID), and the power supply terminal (VBUS) and the ground terminal (GND) are longer than the differential pair terminals (D+ and D−) and the identification line terminal (ID) by a physical distance L1. Accordingly, the power supply terminal (VBUS) and the ground terminal (GND) are brought into contact with corresponding terminals located inside the connector 20 before the differential pair terminals (D+ and D−) and the identification line terminal (ID).

Figure 8:
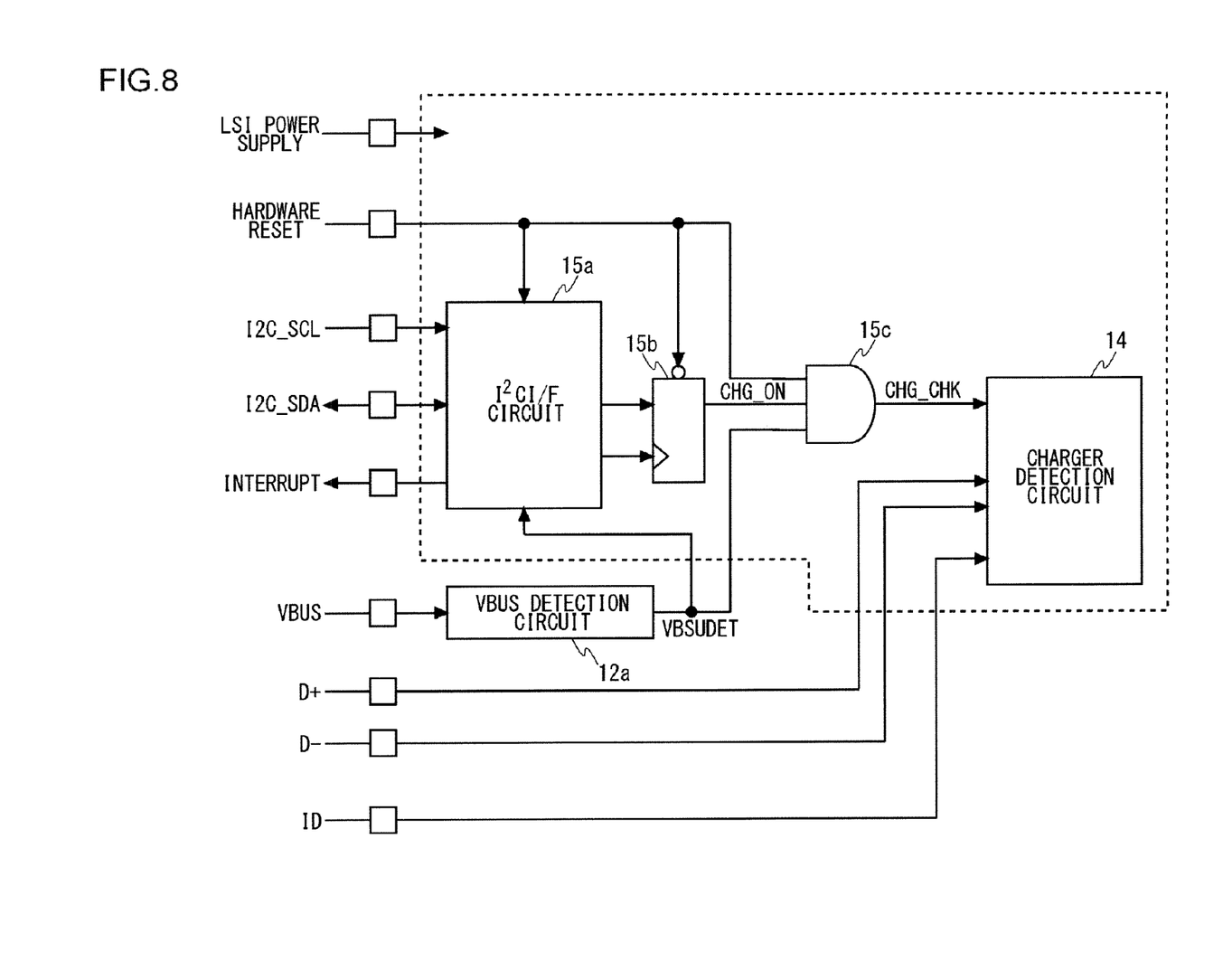
FIG. 8 is a diagram acquired by extracting constituent elements for charger detection out of the input-output circuit illustrated in FIG. 1.

FIG. 8 is a diagram acquired by extracting constituent elements for charger detection out of the input-output circuit 10 illustrated in FIG. 1. In particular, FIG. 8 is a diagram that is acquired by extracting the power supply detection circuit 12, the charger detection circuit 14, and the control unit 15 of the input-output circuit 10 illustrated in FIG. 1 and illustrates a specific configuration example thereof.

A VBUS detection circuit 12a corresponds to the power supply detection circuit 12 illustrated in FIG. 1. An I²CI/F circuit 15a, a charger redetection register 15b, and an AND circuit 15c configure a part of the control unit 15 illustrated in FIG. 1. The VBUS detection circuit 12a is operated by an external power supply supplied from the charger connected to the connector 20. On the other hand, the I²CI/F circuit 15a, the charger redetection register 15b, the AND circuit 15c, and the charger detection circuit 14 operate by receiving the LSI power supply as an internal power supply supplied from the battery 31.

A hardware reset signal HARDWARERESET is input from the main processor 41 to the I²CI/F circuit 15a, the charger redetection register 15b, and the AND circuit 15c. When the hardware reset signal HARDWARERESET is received, the I²CI/F circuit 15a and the charger redetection register 15b reset register values maintained therein to initial values.

When the external power supply VBUS supplied from the charger connected to the connector 20 is detected, the VBUS detection circuit 12a outputs a power supply detection signal VBUSDET to the I²CI/F circuit 15a and the charger detection circuit 14.

The I²CI/F circuit 15a outputs a data signal and a clock signal to the charger redetection register 15b. In the configuration illustrated in FIG. 8, a signal (hereinafter, referred to as a charger detection instruction signal) used for instructing the charger detection circuit 14 to perform a charger detection process is output as the data signal.

The charger redetection register 15b outputs the charger detection instruction signal CHG_ON supplied from the I²CI/F circuit 15a to the AND circuit 15c in accordance with a clock signal that is supplied from the I²CI/F circuit 15a.

When all the power supply detection signal VBUSDET transmitted from the VBUS detection circuit 12a, the hardware reset signal HARDWARERESET transmitted from the main processor 41, and the charger detection instruction signal CHG_ON transmitted from the charger redetection register 15b are significant, the AND circuit 15c outputs a charger checking signal CHG_CHK that is significant to the charger detection circuit 14, and, when any one thereof is insignificant, the AND circuit 15c outputs a charger checking signal CHG_CHK that is insignificant to the charger detection circuit 14.

Here, it may be configured such that being significant is the high level, and being insignificant is the low level, or being significant is the low level, and being insignificant is the high level. In the latter case, it is necessary to use a logic circuit other than the AND circuit 15c.

Figure 9:
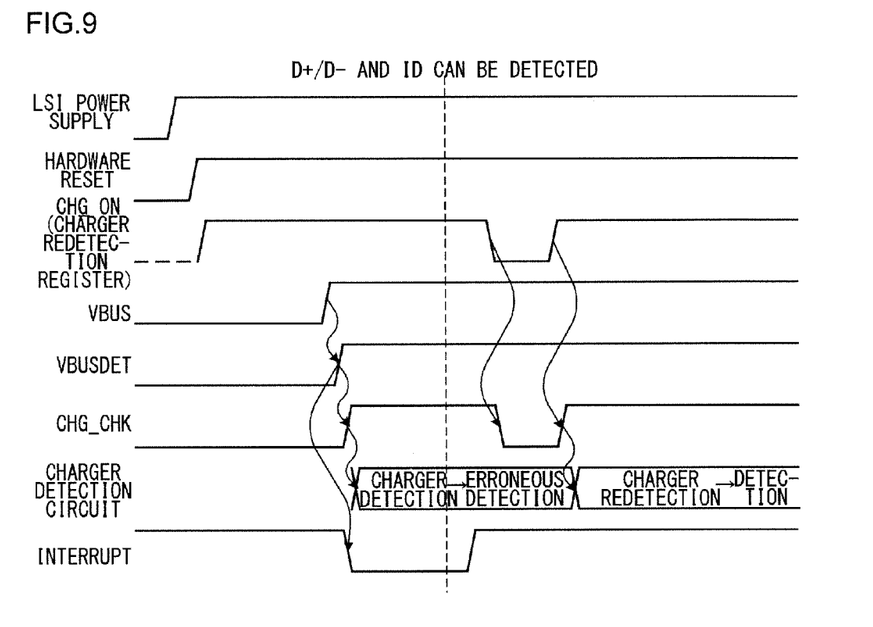
FIG. 9 is a timing chart illustrating the sequence of a charger redetection process in the circuit configuration illustrated in FIG. 8.

FIG. 9 is a timing chart illustrating the sequence of a charger redetection process in the circuit configuration illustrated in FIG. 8. First, when the LSI power supply is supplied to the input-output circuit 10, and the I²CI/F circuit 15a, the charger redetection register 15b, and the AND circuit 15c are started up, a hardware reset signal HARDWARERESET is input to the I²CI/F circuit 15a, the charger redetection register 15b, and the AND circuit 15c. Accordingly, the charger detection instruction signal CHG_ON that is output to the AND circuit 15c from the charger redetection register 15b is at the high level.

When the plug socket of a charger is inserted into the connector 20, the VBUS detection circuit 12a detects an external power supply VBUS and outputs a power supply detection signal VBUSDET having the high level to the I²CI/F circuit 15a and the charger detection circuit 14. Accordingly, all the signals input to the AND circuit 15c are at the high level, and the charger checking signal CHG_CHK output from the AND circuit 15c to the charger detection circuit 14 is at the high level. In addition, when the power supply detection signal VBUSDET is at the high level, the I²CI/F circuit 15a outputs an interrupt signal INTERRUPT to the main processor 41.

When the charger checking signal CHG_CHK is at the high level, the charger detection circuit 14 performs the above-described charger kind detection process. However, at this time point, the D+ terminal, the D− terminal, and the ID terminal, which are located inside the plug socket of the charger, are not brought into contact with corresponding terminals located inside the connector 20. Accordingly, the charger kind detection process fails to result in an erroneous detection.

When a predetermined period elapses after the detection of the external power supply VBUS, the I²CI/F circuit 15a inverts the data signal that is output to the charger redetection register 15b. The predetermined period is set to a period that is acquired by a designer through experiments or simulations. When the data signal is inverted, the charger detection instruction signal CHG_ON output by the charger redetection register 15b is at the low level, and the charger checking signal CHG_CHK output by the AND circuit 15c is at the low level as well.

Thereafter, the I²CI/F circuit 15a inverts the data signal output to the charger redetection register 15b again. Accordingly, the charger detection instruction signal CHG_ON output by the charger redetection register 15b is at the high level, and the charger checking signal CHG_CHK output by the AND circuit 15c is at the high level as well.

When the charger checking signal CHG_CHK is at the high level, the charger detection circuit 14 performs the above-described charger kind detection process again. This time, since the D+ terminal, the D− terminal, and the ID terminal, which are located inside the plug socket of the charger, are brought into contact with corresponding terminals located inside the connector 20 at this time point, the charger kind detection process succeeds. As described above, by instructing the charger detection circuit 14 to perform the charger kind redetection process after the notification of the detection of power feeding is received from the VBUS detection circuit 12a by the I²CI/F circuit 15a, an erroneous detection can be avoided.

Figure 10:
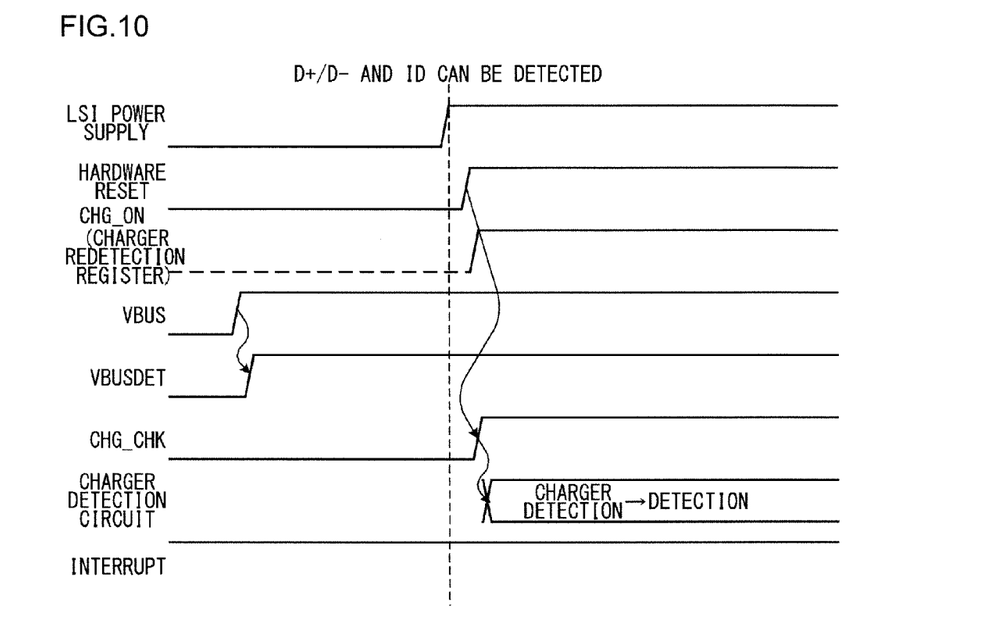
FIG. 10 is a timing chart illustrating the sequence in a case where an LSI power supply is supplied after an external power supply VBUS is supplied in the circuit configuration illustrated in FIG. 8.

FIG. 10 is a timing chart illustrating the sequence in a case where an LSI power supply is supplied after an external power supply VBUS is supplied in the circuit configuration illustrated in FIG. 8. First, when the plug socket of the charger is inserted into the connector 20, the VBUS detection circuit 12a detects the external power supply VBUS and outputs the power supply detection signal VBUSDET having the high level to the I²CI/F circuit 15a and the charger detection circuit 14. However, since power is not supplied to the I²CI/F circuit 15a, the charger redetection register 15b, the AND circuit 15c, and the charger detection circuit 14 at this time point, these are not operated.

Thereafter, when the LSI power supply is supplied to the input-output circuit 10, the I²CI/F circuit 15a, the charger redetection register 15b, the AND circuit 15c, and the charger detection circuit 14 are started up, and a hardware reset signal HARDWARERESET is input to the I²CI/F circuit 15a, the charger redetection register 15b, and the AND circuit 15c. Accordingly, the charger detection instruction signal CHG_ON that is output by the charger redetection register 15b is at the high level.

When the charger detection instruction signal CHG_ON is at the high level, all the signals input to the AND circuit 15c are at the high level, and the charger checking signal CHG_CHK output from the AND circuit 15c is at the high level as well. When the charger checking signal CHG_CHK is at the high level, the charger detection circuit 14 performs the above-described charger kind detection process. Since the D+ terminal, the D− terminal, and the ID terminal, which are located inside the plug socket of the charger, are brought into contact with corresponding terminals located inside the connector 20 at this time point, the charger kind detection process succeeds.

As described above, after the VBUS detection circuit 12a detects power feeding from the outside, when the LSI power supply is supplied to the input-output circuit 10, and the hardware reset signal HARDWARERESET is input to the input-output circuit 10, the I²CI/F circuit 15a instructs the charger detection circuit 14 to start the charger kind detection process without any delay. Accordingly, the charger kind detection process can be started in a speedy manner.

As described above, by performing the sequence process illustrated in FIGS. 9 and 10 by employing the circuit configuration illustrated in FIG. 8, the process of detecting a charger connected to the connector 20 can be correctly performed. In particular, as illustrated in FIG. 9, the charger kind detection process is performed by using as a trigger the detection of an external power supply VBUS, which is performed by the VBUS detection circuit 12a, at the time of inserting the plug. At that time, it is necessary to perform the above-described charger kind detection process in a state in which the D+ terminal, the D− terminal, and the ID terminal are brought into contact with corresponding terminals. Accordingly, the VBUS detection circuit 12a notifies the I²CI/F circuit 15a of the detection of the external power supply VBUS, and the I²CI/F circuit 15a controls the charger redetection register 15b. Accordingly, the I²CI/F circuit 15a can adjust the start timing of the above-described charger kind detection process. Therefore, an erroneous detection due to the shape of the plug socket or the user's insertion timing can be avoided.

In addition, the VBUS detection circuit 12a is operated by the external power supply VBUS, and accordingly, when a charger is connected to the connector 20, the external power supply VBUS can be detected. However, in a state in which the I²CI/F circuit 15a, the charger redetection register 15b, the AND circuit 15c, and the charger detection circuit 14 are not supplied with the LSI power supply, the components may not be operated.

Generally, a digital circuit that is implemented as an LSI is inclined to have an unstable operation immediately after the power supply. Accordingly, by inputting a hardware reset signal HARDWARERESET from the outside, the I²CI/F circuit 15a and the charger redetection register 15b are reset. Then, the charger kind detection process is performed in the condition in which the hardware reset signal HARDWARERESET is input. Accordingly, the charger kind detection process can be performed with accuracy in a speedy manner.

In addition, by starting the charger kind detection process under the AND conditions of the hardware reset signal HARDWARERESET, the charger checking signal CHG_CHK, and the power supply detection signal VBUSDET, an erroneous detection can be suppressed, compared to a case where a detection process is performed through the operation by either the VBUS detection circuit 12a or the I²CI/F circuit 15a.

As described above, the embodiment of the invention has been described. However, the embodiment is merely an example, and it is understood by those skilled in the art that various modifications can be made in a combination of the constituent elements or the processes, and such modifications also fall within the scope of the invention.

What is claimed is:

1. An input-output circuit that connects a connector including: at least a power supply terminal; and a first data terminal and a second data terminal, which are data terminals of a differential pair, and an internal circuit to each other, the input-output circuit comprising:
a power supply detection circuit that detects power feeding to the power supply terminal from the outside; and
a charger detection circuit that specifies the kind of charger by detecting voltages of the first data terminal and the second data terminal, wherein the charger detection circuit detects open, pull-up, pull-down of at least one of the first data terminal and the second data terminal, or formation of a short circuit between both the terminals, wherein the charger detection circuit includes: a first comparator that compares a voltage of the first data terminal and a first reference voltage; a second comparator that compares a voltage of the second data terminal and a second reference voltage; and a determination circuit that determines the kind of charger in accordance with output results of the first comparator and the second comparator.

2. The input-output circuit according to claim 1, wherein the charger detection circuit detects the kind of pull-up/pull-down.

3. The input-output circuit according to claim 1, wherein the charger detection circuit includes: a first pull-up circuit that is used for pulling up the first data terminal; a first pull-down circuit that is used for pulling down the first data terminal; a second pull-up circuit that is used for pulling up the second data terminal; and a second pull-down circuit that is used for pulling down the second data terminal, and the determination circuit connects the first data terminal to the first pull-up circuit and the second data terminal to the second pull-down circuit in a first step and connects the first data terminal to the first pull-down circuit and the second data terminal to the second pull-up circuit in a second step.

4. The input-output circuit according to claim 3, further comprising: a control unit that receives a detection result from the charger detection circuit in response to the voltages of the first data terminal and the second data terminal, wherein the control unit notifies the charging circuit of the voltage detection.

5. The input-output circuit according to claim 4, wherein the control unit notifies a main processor of the kind of charger connected to the connector, and the main processor instructs the charging circuit to perform a charging control according to the kind of charger.

6. The input-output circuit according to claim 4, further including an identification terminal voltage detection circuit coupled to the control unit, the identification terminal voltage detection circuit configured to detect a voltage of an ID terminal and notify the control unit.

7. The input-output circuit according to claim 6, further including a data line switching unit coupled to the control unit.

8. The input-output circuit according to claim 1, wherein the charger detection circuit further includes a third comparator that compares the voltage of the second data terminal and a third reference voltage, and the determination circuit determines a determination result of the second data terminal as a middle level when the output of the second comparator is a low level and the output of the third comparator is a high level.

9. The input-output circuit according to claim 8, further comprising: a control unit that receives a detection result from the charger detection circuit in response to the voltages of the first data terminal and the second data terminal, wherein the control unit notifies the charging circuit of the voltage detection.

10. The input-output circuit according to claim 9, wherein the control unit notifies a main processor of the kind of charger connected to the connector, and the main processor instructs the charging circuit to perform a charging control according to the kind of charger.

11. The input-output circuit according to claim 10, further including an identification terminal voltage detection circuit coupled to the control unit, the identification terminal voltage detection circuit configured to detect a voltage of an ID terminal and notify the control unit.

12. The input-output circuit according to claim 11, further including a data line switching unit coupled to the control unit.

13. The input-output circuit according to claim 1, further comprising: a control unit that receives a detection result from the charger detection circuit in response to the voltages of the first data terminal and the second data terminal, wherein the control unit notifies the charging circuit of the voltage detection.

14. The input-output circuit according to claim 13, wherein the control unit notifies a main processor of the kind of charger connected to the connector, and the main processor instructs the charging circuit to perform a charging control according to the kind of charger.

15. The input-output circuit according to claim 13, further including an identification terminal voltage detection circuit coupled to the control unit, the identification terminal voltage detection circuit configured to detect a voltage of an ID terminal and notify the control unit.

16. The input-output circuit according to claim 13, further including a data line switching unit coupled to the control unit.

* * * * *